US011466628B2

(12) United States Patent
Davies et al.

(10) Patent No.: US 11,466,628 B2
(45) Date of Patent: Oct. 11, 2022

(54) GAS TURBINE ENGINE FLOW CONTROL (71) Applicant: ROLLS-ROYCE plc, London (GB)

(72) Inventors: Cerith Davies, Uttoxeter (GB); Marko Bacic, Oxford (GB)

(73) Assignee: ROLLS-ROYCE plc, London (GB)

(*) Notice: Subject to any disclaimer, the term of this patent is extended or adjusted under 35 U.S.C. 154(b) by 33 days.

(21) Appl. No.: 16/945,061

(22) Filed: Jul. 31, 2020

(65) Prior Publication Data
US 2021/0062732 A1 Mar. 4, 2021

(30) Foreign Application Priority Data
Aug. 28, 2019 (GB) .................................. 1912322

(51) Int. Cl.
F02C 9/54 (2006.01)
F02C 3/06 (2006.01)
F02C 7/36 (2006.01)

(52) U.S. Cl.
CPC ............... F02C 9/54 (2013.01); F02C 3/062 (2013.01); F02C 7/36 (2013.01); F05D 2220/323 (2013.01); F05D 2240/12 (2013.01); F05D 2240/60 (2013.01); F05D 2260/40311 (2013.01); F05D 2270/051 (2013.01); F05D 2270/301 (2013.01); F05D 2270/304 (2013.01); F05D 2270/306 (2013.01)

(58) Field of Classification Search
CPC ...... F02C 9/54; F02C 9/20; F02C 7/36; F05D 2220/323; F05D 2270/301; F05D 2270/304; F05D 2270/306; F05D 2270/051; F05D 2240/12; F05D 2240/60
See application file for complete search history.

(56) References Cited

U.S. PATENT DOCUMENTS 4,928,482 A * 5/1990 Pollak ....................... F02K 1/17
60/39.27
4,947,643 A 8/1990 Pollak et al.
4,949,276 A 8/1990 Staroselsky et al.
(Continued)

FOREIGN PATENT DOCUMENTS

DE 3940248 A1 10/1990
EP 0363301 A1 4/1990
EP 3034841 B1 * 5/2022 ................ F02C 9/22

OTHER PUBLICATIONS

Feb. 21, 2020 Search Report issued in Great Britain Patent Application No. 1912322.3.
(Continued)

Primary Examiner — Craig Kim
(74) Attorney, Agent, or Firm — Oliff PLC (57) ABSTRACT A method of controlling a gas turbine engine including receiving an instantaneous thrust demand for current operation of the engine, determining the inlet flow rate and/or the pressure ratio within the compressor of the engine and determining whether the inlet flow rate and/or the pressure ratio match the working line for the compressor. The angle of one or more vane of the compressor is adjusted according to a closed control loop if the inlet flow rate and/or pressure ratio lie outside said desired range in order to adjust the inlet inflow rate and/or pressure ratio to meet the working line. The fuel flow to the engine combustor is adjusted concurrently in order to meet the thrust demand.

18 Claims, 5 Drawing Sheets (56) References Cited

U.S. PATENT DOCUMENTS

| | | | | |
|---|---|---|---|---|
| 5,083,277 | A | | 1/1992 | Shutler |
| 5,133,182 | A | | 7/1992 | Marcos |
| 5,303,545 | A | | 4/1994 | Larkin |
| 5,357,748 | A | * | 10/1994 | Khalid ................ F04D 27/0246 60/236 |
| 5,709,526 | A | * | 1/1998 | McLeister ........... F04D 27/0207 415/17 |
| 6,164,057 | A | * | 12/2000 | Rowen ...................... F02C 9/54 60/773 |
| 7,096,669 | B2 | * | 8/2006 | Narayanan .......... F04D 27/0284 60/39.24 |
| 2011/0077783 | A1 | * | 3/2011 | Karpman ............... G05B 17/02 700/282 |
| 2012/0215417 | A1 | * | 8/2012 | Boyer ........................ F02C 9/22 701/100 |
| 2014/0090392 | A1 | * | 4/2014 | Meisner ..................... F02C 9/54 60/39.23 |
| 2014/0093350 | A1 | * | 4/2014 | Meisner .................. F01D 17/08 415/17 |
| 2015/0113996 | A1 | * | 4/2015 | Cai ........................... F02C 9/54 60/773 |
| 2017/0138306 | A1 | * | 5/2017 | Miller ....................... F02C 7/36 |
| 2017/0211485 | A1 | * | 7/2017 | Tramontin .............. F01D 9/041 |
| 2018/0079510 | A1 | * | 3/2018 | Bacic ........................ F02C 7/32 |
| 2018/0347474 | A1 | * | 12/2018 | Meisner ................ F01D 17/085 |
| 2021/0017878 | A1 | * | 1/2021 | Golfin .................... F01D 15/12 |
| 2021/0062732 | A1 | * | 3/2021 | Davies ...................... F02C 7/36 |
| 2021/0108595 | A1 | * | 4/2021 | Khalid ...................... F02C 6/20 |
| 2022/0097864 | A1 | * | 3/2022 | Baladi ....................... F02C 9/00 |
| 2022/0205382 | A1 | * | 6/2022 | Sambhav ............... F02B 37/24 |

OTHER PUBLICATIONS

Bonfiglio et al.: "Gas turbine generating units control via feedback linearization approach", Energy, Elsevier, Asterdam, NL, vol. 121, Jan. 9, 2017 (Jan. 9, 2017), pp. 491-512.

Jan. 15, 2021 Extended European Search Report issued in European Patent Application No. 20188294.1.

* cited by examiner

GAS TURBINE ENGINE FLOW CONTROL

CROSS-REFERENCE TO RELATED APPLICATIONS

This specification is based upon and claims the benefit of priority from UK Patent Application Number 1912322.3 filed on 28 Aug. 2019, the entire contents of which are incorporated herein by reference.

TECHNICAL FIELD

The present disclosure relates to a method and system for controlling flow in a gas turbine engine, for example by controlling vane orientation.

BACKGROUND

In normal operation of a gas turbine engine air is drawn into the compressor stage of the engine. In the compressor, the air is compressed to create a high-pressure region. The engine comprises a plurality of compressor stages extending axially along the engine, each stage compressing the air to an increasingly higher pressure. Each stage typically comprises a plurality of rotating blades, the blades arranged at a fixed angled with respect to the airflow. Inter-stage stator vanes are provided to redirect the airflow and their orientation may be adjusted to vary/maximise airflow.

It is generally desirable to create a high pressure ratio in order to extract the maximum amount of work from the compressed air and the fuel during the combustion cycle. However, to maintain the high pressure ratio, the compressor will operate close to a stall condition, i.e. a condition in which the compressor is incapable of maintaining the throughput of air over the whole flow area to maintain the pressure ratio. This can lead to a dynamic flow regime in which recirculations can occur in the vicinity of the blades.

However, in the event of a rapid change in conditions (e.g. a restriction of the air flow into the engine during a bird strike, or a high throttle change), the compressor will not be able to maintain the high pressure ratio. Therefore, the high-pressure region will begin to flow back in a reverse direction through the compressor and air can be expelled through the inlet. This is referred to as surge and results in a reduction in engine thrust. Moreover, due to the high pressures involved, as the air flows back towards the inlet, a pressure wave may be formed which may damage the compressor blades or shafts etc., causing catastrophic damage to the engine.

In order to mitigate this, engines are typically operated at a reduced pressure away from the steady state, i.e. to create a margin between the operating pressure and the surge pressure. As shown in the compressor map of FIG. 1, in the pressure ratio/inlet flow space the engine is typically operated at a working line 42.

Figure 1:
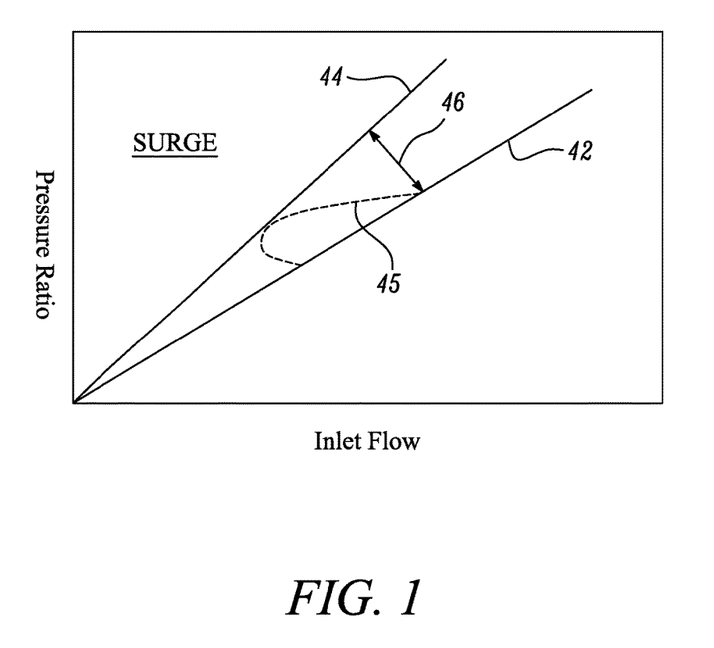
FIG. 1 shows a generic plot of pressure ratio against inlet flow for a conventional high pressure compressor of a gas turbine engine.

The working line 42 is sufficiently removed from the surge line 44, such that a normal transient event 45 does not encroach on the surge line 44, thus allowing a sufficiently safe margin of operation of the engine. The working line 42 is therefore at a reduced pressure ratio than a surge line 44, at which surge onset will occur. The difference between the working line 42 and the surge line 44 is the surge margin 46.

A large surge margin 46 reduces the risk of surge in the event of a reduced air flow during an unexpected transient event 45 (e.g. restricted airflow), however, the lower operating pressure reduces the working efficiency of the engine. A balance is therefore struck between the increased safety margin and the reduced engine efficiency.

It is known that regulation of the compressor airflow and/or pressure ratio can be achieved by regulation of the angle of the interstage stator vanes. The angle of the vanes may be changed to increase/decrease airflow through the compressor stages according to a schedule dictated by the operating speed of the engine. The angle of the interstage vanes is conventionally set according to a passive regime which is merely a function of the rotational speed of the compressor shaft. This schedule is delivered in an open loop, reactive to the achieved rotational speed of the compressor.

Additionally, control of airflow rate and/or pressure is achieved by control of the fuel flow into the engine. Similarly, this is set as a passive function of the rotational speed of the compressor shaft.

However, this regime does not take into account the actual airflow rate and/or pressure ratio within the compressor due to the regime being controlled by the speed of the compressor. The vanes are controlled assuming a substantially steady state operation of the engine. Therefore, during a transient event, the system is slow to react to the change in airflow/pressure and a lag is created due to the additional time for a resulting change in compressor speed to be sensed. The surge margin must be sufficiently large to accommodate this lag, thus reducing engine efficiency.

It is aim of the present disclosure to overcome or ameliorate one or more of the above problems.

SUMMARY

According to a first aspect there is provided: a method of controlling a gas turbine engine comprising: receiving an instantaneous thrust demand for current operation of the engine; determining a flow rate and/or the pressure ratio for a compressor of the engine; determining whether the flow rate and/or the pressure ratio meet a predetermined operational condition for the compressor; and adjusting the angle of one or more aerofoil of the compressor according to a closed control loop if the flow rate and/or pressure ratio do not meet the predetermined operational condition in order to adjust the flow rate and/or pressure ratio towards the predetermined operational condition; and concurrently adjusting fuel flow to the engine combustor in order to meet the thrust demand.

According to a second aspect there is provided: a controller for a gas turbine engine comprising machine readable instructions for controlling operation of the gas turbine engine by: receiving an instantaneous thrust demand for current operation of the engine; determining a flow rate and/or the pressure ratio for a compressor of the engine; determining whether the flow rate and/or the pressure ratio meet a predetermined operational condition; and adjusting the angle of one or more aerofoil of the compressor according to a closed control loop if the flow rate and/or pressure ratio do not meet said predetermined operational condition in order to return the flow rate and/or pressure ratio towards said condition; and concurrently adjusting fuel flow to the engine combustor in order to meet the thrust demand.

According to a third aspect there is provided: a gas turbine engine or an aircraft comprising the controller of the second aspect, or a control system arranged to operate according to the method of the first aspect.

The predetermined operational condition may comprise a flow condition. The condition may comprise a condition for both the flow rate and pressure ratio. The condition may comprise a predetermined relationship between the pressure ratio and flow rate, e.g. a mathematical expression defining relative values for the pressure ratio and flow rate. The predetermined condition/relationship may be defined as a working line for the compressor, e.g. a line on a graph of pressure ratio against flow rate. The line may be a straight line.

The controller may look for a match or mismatch between the current sensed flow rate and pressure ratio and the working line of the compressor.

The flow rate may be an inlet flow rate for the compressor.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable).

The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limiting example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION

Embodiments will now be described by way of example only, with reference to the Figures, in which.

DETAILED DESCRIPTION

Figure 2:
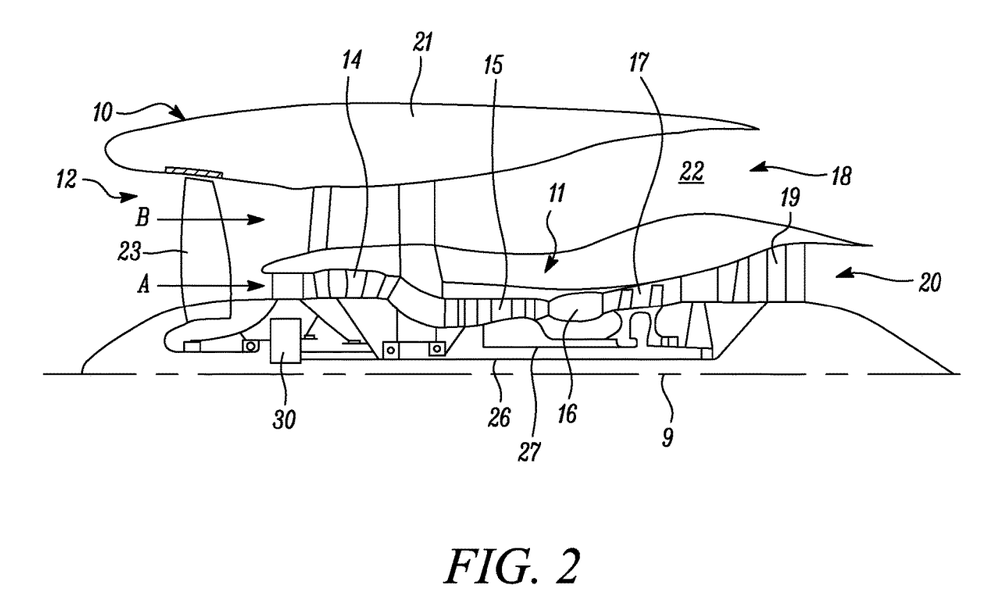
FIG. 2 is a sectional side view of a gas turbine engine.

FIG. 2 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 3:
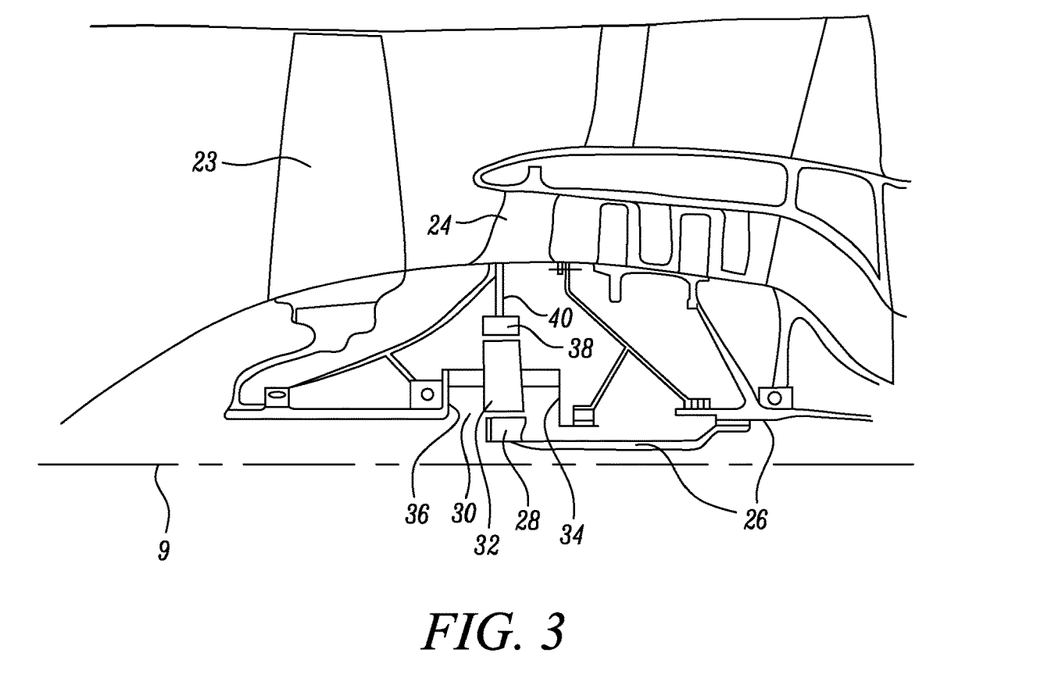
FIG. 3 is a close up sectional side view of an upstream portion of a gas turbine engine.

An exemplary arrangement for a geared fan gas turbine engine 10 is shown in FIG. 3. The low pressure turbine 19 (see FIG. 2) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 4:
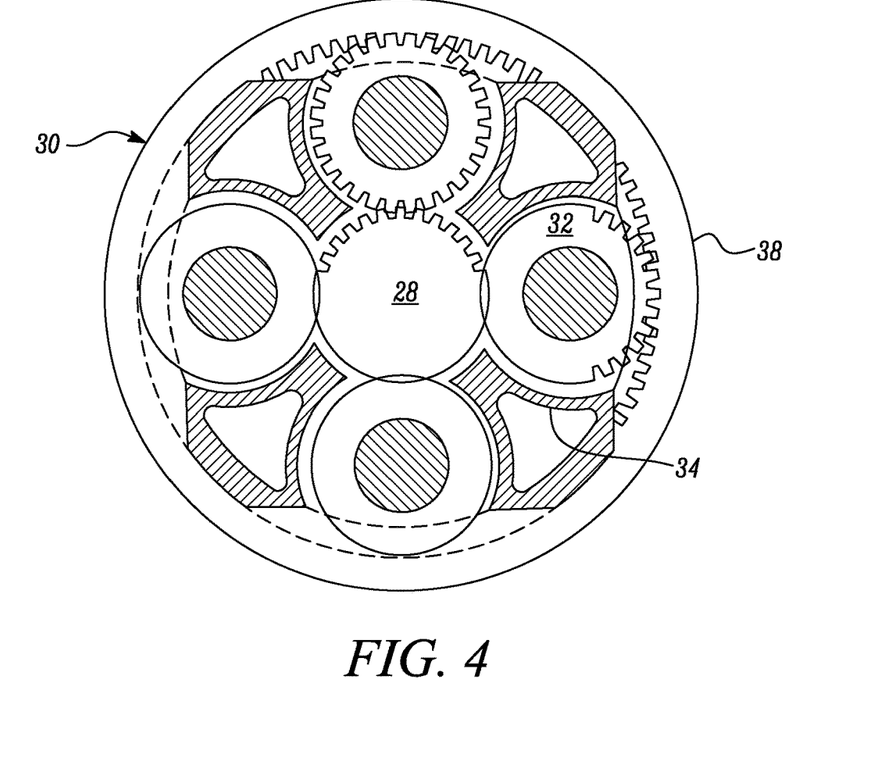
FIG. 4 is a partially cut-away view of a gearbox for a gas turbine engine.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 3 and 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 3 and 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 3. For example, where the gearbox 30 has a star arrangement (described above), the skilled person would readily understand that the arrangement of output and support linkages and bearing locations would typically be different to that shown by way of example in FIG. 3.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 2), and a circumferential direction (perpendicular to the page in the FIG. 2 view). The axial, radial and circumferential directions are mutually perpendicular.

Figure 5:
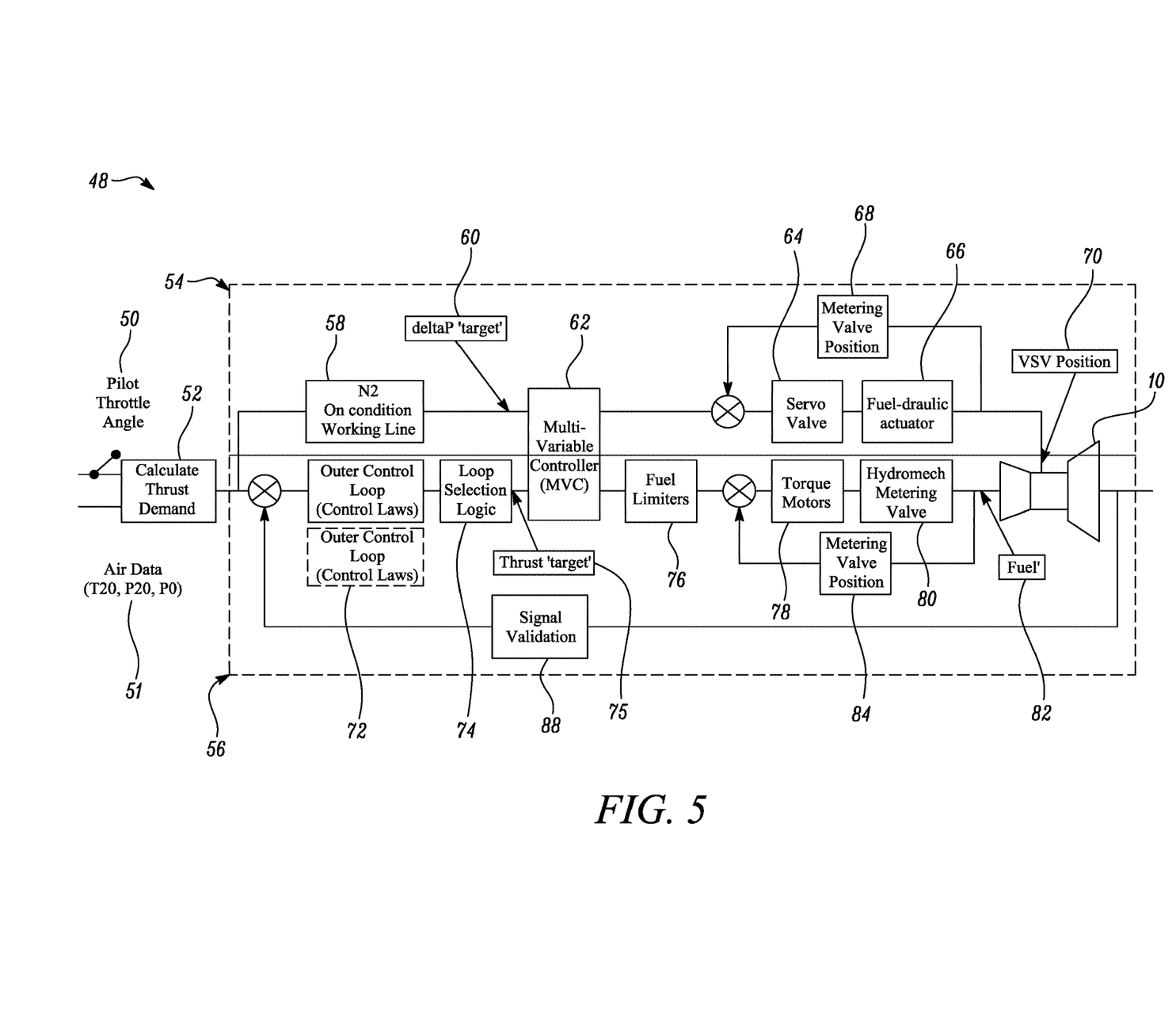
FIG. 5 shows an example control scheme according to the present disclosure.

FIG. 5 shows a control system 48 according to the present disclosure for operation of the engine 10.

The control system 48 receives a thrust instruction signal 50 to specify a specific required thrust output from the engine. The thrust instruction signal 50 is generated by a pilot throttle actuator (e.g. by the angular position thereof) onboard the aircraft. In other examples, the thrust instruction signal 50 is generated by a control system on board the aircraft and/or the engine as is conventional.

The control system 48 receives air data 51 relating to the properties of the air entering the engine 10, and/or flowing through the compressor(s), during the current operating conditions. This may include the pressure and/or temperature at one or more locations (e.g. at the engine intake 12, downstream of the fan 23, at the high pressure compressor 15 and/or at the low pressure compressor 14). The flow readings may be taken at one or more compressor stage as required.

The current operating conditions may be directly measured using conventional means, for example, using temperature, pressure and/or flow sensors. In other embodiments, the current operating conditions are estimated, for example, the rotational speed of the compressor etc.

The thrust instruction signal 50 is received by a first controller 52. The first controller 52 is configured to determine an instantaneous thrust demand for the engine according to the received signal 50.

The thrust demand is received by a first control loop 54 configured to control the angle of one or more aerofoil of the compressor, and a second control loop 56 to control the fuel flow into a combustor of the engine. The following disclosure concerns how those control loops can be performed, e.g. concurrently and/or commonly, using multivariate control.

The first control loop 54 comprises a second controller 58 to determine desired/optimum pressure and/or flow conditions in the compressor according to the thrust demand provided by the first controller 52 (e.g. the working line pressure, pressure ratio and/or flow rate).

The desired working line condition may lie within a predetermined pressure ratio and/or flow rate range for a predetermined thrust, thereby providing a margin about the working line for which a transient event is considered acceptable.

The second controller 58 determines a difference in the desired working line pressure and/or airflow at a given thrust demand and the current operating pressure and/or airflow. The second controller 58 therefore outputs a ΔP target 60 indicating a difference between desired and current pressures in the engine. Additionally or alternatively, the second controller 58 outputs a ΔV target (i.e. a flow rate change target) indicating the difference in desired and current airflow through the engine. The/each target may seek to return the compressor operation to the working line, or within an acceptable/small divergence therefrom.

A multi-variable controller 62 receives the outputs from the second controller 58. The multi-variable controller 62 then calculates the appropriate angle for the variable stator vanes of the compressor, to minimise the difference in pressure/airflow between the working line and the current operating conditions.

The angle signal is then sent to a valve system (e.g. servo valve 64 and/or fuel-draulic valve 66) to move the variable stator vanes 70 to the appropriate angle. The valve position is monitored by a position sensor within a position feedback loop 68 to ensure the vanes are in the correct position, and adjustment is performed as necessary.

The second control loop 56 comprises a series of controllers 72, 74 configured to determine a difference between the desired thrust determined by the thrust demand and the current thrust produced by the engine. The controllers therefore output a "thrust target" 75, e.g. comprising a change in the current thrust needed to meet the thrust demand.

Each controller may utilise an actuator to regulate its control parameters but conscious of the fact that cross coupling exists between both loops—which in this disclosure is addressed though de-coupling of this interaction in a multi-variable controller.

The "thrust target" 75 is received by the multi-variable controller 62. The multi-variable controller 62 then calculates the appropriate fuel flow to maintain the desired thrust according to the current and/or desired engine parameters. This provides a measure of the required volumetric fuel flow into the combustor that can be used to control fuel delivery.

The calculation of the fuel flow rate and the angle of the stator vanes are performed concurrently/simultaneously, such that adjustment of the fuel flow and the angle of the stator vanes is performed in concert to maintain the desired thrust output. Both the engine thrust and the compressor pressure ratio are controlled in a multi-variable manner. The control laws governing the control of the fuel flow and the angle of the stator vanes will be described below.

The multi-variable controller 62 outputs a signal to a fuel control system 76 (e.g. comprising a fuel limiter) to control fuel flow to the engine accordingly.

The fuel control system sends a signal to a fuel metering system (e.g. comprising torque motors 78 and/or a hydro-mechanical metering valve 80) to provide an adjusted fuel flow rate 82. The hardware of the fuel metering system may be conventional save for the manner in which it is controlled according to the present disclosure. The fuel metering system is monitored by a fuel feedback loop 84 to ensure the valves are in the correct position to provide the appropriate fuel flow, and adjustment is performed as necessary. The feedback loop 84 may make use of suitable sensors, e.g. measuring fuel flow rate and/or an operational condition of one or more components of the metering system. A pump or valve condition/position may be monitored, e.g. a fuel metering valve position.

An output thrust of the engine is measured using conventional techniques. For example, this may be achieved by measuring one or more of: low pressure shaft speed; engine Pressure Ratio (EPR); or Turbofan Power Ratio (TPR).

The output thrust is then monitored by a thrust feedback loop, e.g. comprising a controller 88. The thrust feedback monitors the thrust produced by the engine and forms part of the fuel control loop 56, i.e. feeding the thrust values back into the start of fuel control loop 56. The measured thrust is compared with the thrust demand and the fuel flow and/or the stator vane angle are adjusted accordingly.

As described herein, both the fuel flow and the angle of the compressor vanes are controlled in a closed loop manner.

Whilst individual 'controllers' are described herein for different stages/aspects of the control system 48, it will be appreciated by the skilled person that such controllers may or may not comprise separate computational algorithms. For example, controllers may comprise control modules of common or different computational processors. The order/sequence of steps within each control loop is as shown in FIG. 5 although it will be appreciated that the different control loops 54 and 56, including the feedback loops 68 and 84 thereof, can operate concurrently and/or in parallel.

A control law governing the concurrent operation of the one or more compressor aerofoil angle and the fuel flow will now be described according to an example of the present disclosure.

Figure 6:
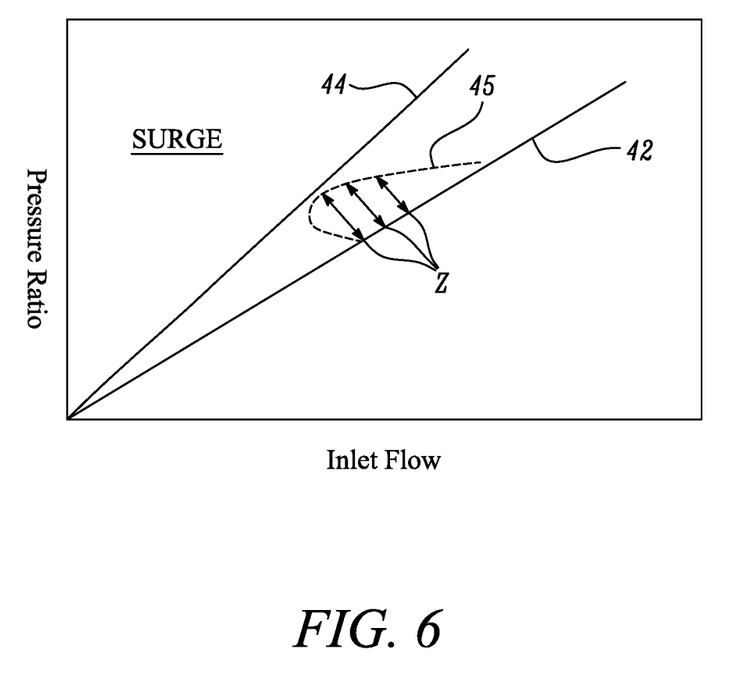
FIG. 6 shows a transient excursion in a plot of pressure ratio against inlet flow.

Concurrent/simultaneous control of the aerofoil angle and the fuel flow is achieved through mathematical de-coupling of the algorithms used by the multi-variable controller 62. As shown in FIG. 6, during a transient event 45 (dashed line), the pressure ratio and/or the inlet flow deviate from the working line 42. This deviation is defined as an excursion Z. The control law therefore attempts to minimise the excursion Z.

Firstly, an algorithm is derived to identify a first order characteristic of the fuel flow to thrust relationship and/or the vane angle to pressure ratio/flow characteristic relationship. Additionally, the algorithm determines the cross-coupling terms between these two loops (e.g. between fuel flow and vane angle characteristics). The algorithm then mathematically de-couples these characteristics and allows fuel flow and vane angle actuation to be applied simultaneously to deliver the required trust demand and compressor pressure ratio/flow characteristic.

According to a Multiple Input Multiple Output (MIMO) control law, the following system of equations (1) can be defined:

$$\dot{x} = f(x) + g(x)u$$

$$y = h(x) \tag{1}$$

Where x is the internal state of the system, u is a controlled, input parameter of the system, y is the system output variable and f, g and h are to be determined dynamic response variables.

A 2×2 MIMO system can be defined where:

$$x = \begin{pmatrix} NH \\ Z \end{pmatrix},$$

where NH is the spool speed and Z is the excursion.

$$u = \begin{pmatrix} W_f \\ VSV \end{pmatrix},$$

where $W_f$ is the fuel flow and VSV is the angle of the variable stator vane.

Substituting the above definitions into equation (1) for a 2×2 MIMO system, yields:

$$\frac{d}{dt}\begin{pmatrix} NH \\ Z \end{pmatrix} = \begin{pmatrix} f_1(NH, Z) \\ f_2(NH, Z) \end{pmatrix} + \begin{pmatrix} g_1(NH, Z) \\ g_2(NH, Z) \end{pmatrix}\begin{pmatrix} W_f \\ VSV \end{pmatrix} \quad (2)$$

$$\begin{pmatrix} y_1 \\ y_2 \end{pmatrix} = \begin{pmatrix} NH \\ Z \end{pmatrix} \quad (3)$$

where $$\begin{pmatrix} g_1 \\ g_2 \end{pmatrix} \text{ and } \begin{pmatrix} f_1 \\ f_2 \end{pmatrix}$$

are respective to be determined non-linear functions.

The multi-variable de-coupling is achieved by recognising that in some cases we can simplify the dynamics by input-state linearization. The rate of change of output variable v is chosen judiciously as follows:

$$\begin{pmatrix} v_1 \\ v_2 \end{pmatrix} = \frac{d}{dt}\begin{pmatrix} y_1 \\ y_2 \end{pmatrix} = \frac{d}{dt}\begin{pmatrix} NH \\ Z \end{pmatrix} \quad (4)$$

which in conjunction with (2) and (3) leads to $$\begin{pmatrix} W_f \\ VSV \end{pmatrix} = -\begin{pmatrix} g_1(NH, Z) \\ g_2(NH, Z) \end{pmatrix}^{-1}\begin{pmatrix} f_1(NH, Z) \\ f_2(NH, Z) \end{pmatrix} + \begin{pmatrix} g_1(NH, Z) \\ g_2(NH, Z) \end{pmatrix}^{-1}\begin{pmatrix} v_1 \\ v_2 \end{pmatrix} \quad (5)$$

where f(NH,Z) and g(NH,Z) are to be determined.

Using equation (2), for a perturbation about an operating point $W_{f_0}$ and $VSV_0$ of $\Delta W_f$ and $\Delta VSV$, respectively, yields:

$$\frac{d}{dt}\begin{pmatrix} NH \\ Z \end{pmatrix} = f(NH_0, Z_0) + g(NH_0, Z_0)\begin{pmatrix} W_{f_0} + \Delta W_f \\ VSV_0 + \Delta VSV \end{pmatrix} \quad (6)$$

For small perturbations $$\begin{pmatrix} \Delta W_f \\ \Delta VSV \end{pmatrix} \to 0$$

at the equilibrium condition $NH_0$, $Z_0$, therefore:

$$0 = f(NH_0, Z_0) + g(NH_0, Z_0)\begin{pmatrix} W_{f_0} \\ VSV_0 \end{pmatrix} \quad (7)$$

Substituting equation (7) into equation (6) yields:

$$\frac{d}{dt}\begin{pmatrix} NH \\ Z \end{pmatrix} = \begin{pmatrix} g_{11} & g_{12} \\ g_{21} & g_{22} \end{pmatrix}\begin{pmatrix} \Delta W_f \\ \Delta VSV \end{pmatrix} = \begin{pmatrix} v_1 \\ v_2 \end{pmatrix} \quad (8)$$

By perturbing the fuel flow $W_f$ and the angle of the variable stator VSV individually and measuring the respective rates of response, g(NH,Z) can be mapped out across the respective operating points. Using equation (7) an appropriate mapping for f(NH,Z) can be made across the respective operating points. The control law in equation (5) can then be implemented using the virtual input v.

But choosing v as a set of compensated loop outputs thus $$v = \begin{pmatrix} \alpha(NH_d - NH) \\ \beta(Z_d - Z) \end{pmatrix} \quad (11)$$

where:
α and β are constants
$NH_d$ is the spool speed at a set point (e.g. the working line speed) and $Z_d$ is the excursion at a set point (e.g. the working line pressure ratio/flow rate)

This provides a closed loop dynamic for NH and Z that is first order, decoupled and independent of the operating point.

The above control law allows the transient excursion 'Z' to be actively controlled in a continuous manner throughout the transient event (e.g. engine maneuver, bird strike, ice intake etc.), whilst maintaining the predetermined thrust demand. The system therefore actively controls the pressure ratio/inlet flow within the compressor during an excursion back toward the desired working line pressure ratio/inlet flow.

The controller therefore utilises an actuator to regulate the control of the fuel flow and the vane angle respectively, whilst taking into consideration cross coupling between both control loops.

The system allows a change in one of the fuel flow and the vane angle without affecting the thrust output, by providing a simultaneous reactive change in the other of the fuel flow and the vane angle accordingly.

Figure 7:
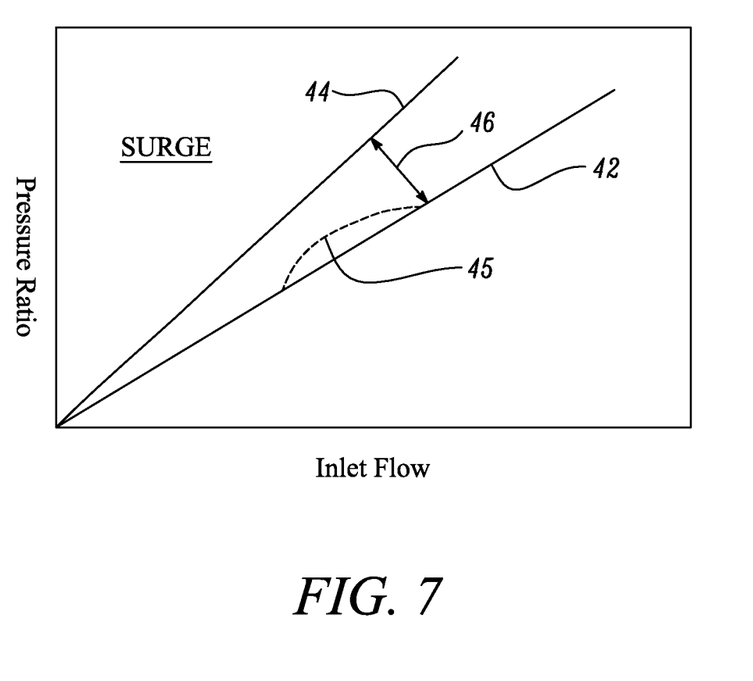
FIG. 7 shows a transient excursion of reduced magnitude in a plot of pressure ratio against inlet flow.

As shown in the FIG. 7, the concurrent, closed loop control of the pressure ratio and/or fuel flow provide closer control of the engine thrust and reduces the magnitude of the transient excursion 45 within the engine. Therefore, for a nominal transient event (i.e. of a magnitude demonstrated in FIG. 1), the magnitude of the transient excursion 45 can be significantly reduced. This will allow the engine to operate within an increased safety margin.

The duration of the transient event may also be reduced.

Figure 8:
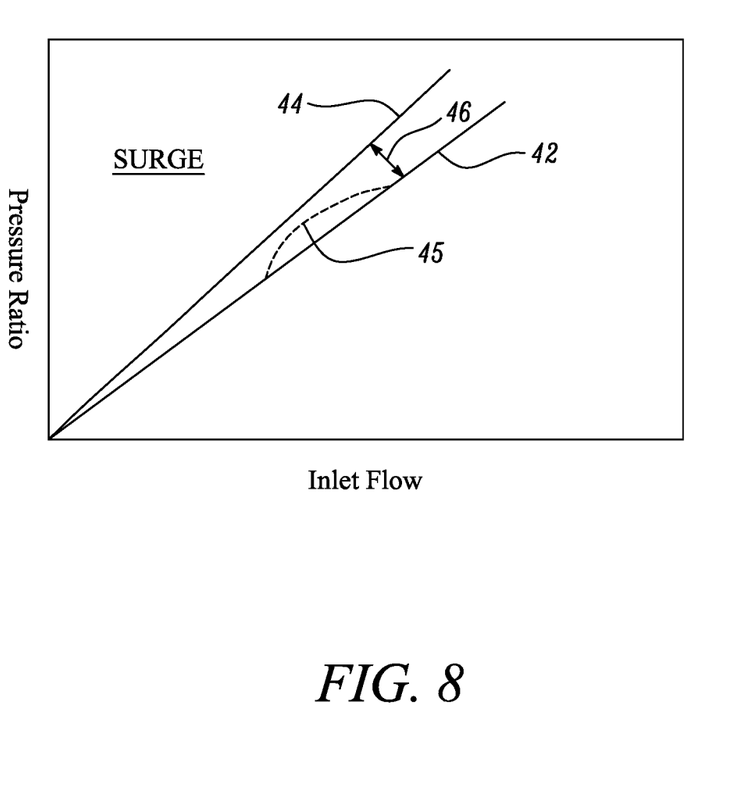
FIG. 8 shows a plot of pressure ratio against inlet flow with a modified working line.

Alternatively, as shown in FIG. 8, due to the reduced magnitude of the transient excursion 45, the surge margin 46 may be increased. This may allow the working line 42 to be operated safely at an increased pressure ratio, i.e. closer to the surge line 44, thereby increasing the efficiency of the engine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

Advantages of the Invention

The control method of the present disclosure may permit improved operating efficiency of a gas turbine engine.

The control method of the present disclosure may allow adoption of a reduced surge margin for a gas turbine engine and/or may allow greater safety at a conventional surge margin.

The present disclosure may allow control of the pressure ratio/airflow in a gas turbine engine without detriment to the operation of a primary thrust control system (i.e. without interfering with a thrust demand of an engine)

The present disclosure may allow independent control of thrust and surge margin excursion in a gas turbine engine.

The present disclosure may reduce the time taken for a control system to react to a transient air flow event in a gas turbine engine.

The present disclosure may provide active, closed loop control of a transient excursion from a steady state operating condition.

The present disclosure may allow a reduction in the specific fuel consumption of the engine.

We claim:

1. A method of controlling a gas turbine engine, the method comprising:
   receiving an instantaneous thrust demand for current operation of the gas turbine engine;
   determining a flow rate and/or pressure ratio for a compressor of the gas turbine engine;
   determining whether the flow rate and/or the pressure ratio meets a predetermined operating condition for the compressor; and
   adjusting an angle of one or more aerofoil of the compressor according to a closed control loop if the flow rate and/or pressure ratio do not meet said predetermined operating condition in order to adjust the flow rate and/or pressure ratio towards said predetermined operating condition; and
   concurrently adjusting a fuel flow to a combustor of the gas turbine engine in order to meet the thrust demand by mathematically decoupling terms for adjusting the angle of the one or more airfoil of the compressor and terms for adjusting the fuel flow to the combustor of the gas turbine engine in order to adjust the angle of the one or more airfoil of the compressor and to adjust the fuel flow to the combustor of the gas turbine engine at a same time.

2. The method of claim 1, where the aerofoil comprises a stator vane and the method further comprises adjusting an angle of an array of stator vanes of the compressor.

3. The method of claim 1, where the flow rate and/or the pressure ratio are directly measured.

4. The method of claim 1, where the flow rate is estimated by measuring the compressor speed.

5. The method of claim 1, where the predetermined operating condition comprises a working line of a gas turbine engine and/or a threshold above the working line.

6. The method of claim 1, where a first closed control loop is implemented for adjusting the angle of the one or more aerofoil and a second closed control loop is implemented for adjustment of the fuel flow, wherein a common multivariable controller determines the adjustments for both the first and second closed control loops.

7. The method of claim 6, where the first and second control loops are operated in parallel based on the outputs of the common multivariable controller.

8. The method of claim 1, where concurrent control of the fuel flow is determined according to a control algorithm which comprises de-coupling of an aerofoil angle variable and a fuel flow variable.

9. The method of claim 8, where the de-coupling is achieved using input state linearization, the angle and the fuel flow comprising respective inputs in the control algorithm.

10. The method of claim 8, where the control algorithm perturbates the fuel flow and the angle of the aerofoil individually and measures the respective rates of response.

11. The method of claim 8, where the control algorithm implements the expression:
Where:

$$\frac{d}{dt}\begin{pmatrix}NH\\Z\end{pmatrix}=\begin{pmatrix}g_{11}&g_{12}\\g_{21}&g_{22}\end{pmatrix}\begin{pmatrix}\Delta W_f\\\Delta VSV\end{pmatrix}$$

NH is a determined spool speed
Z is a determined excursion, where the excursion is the magnitude of the pressure ratio and inlet flow rate away from the predetermined range, $g_{ii}$, $g_{12}$, $g_{21}$ and $g_{22}$ are to be determined non-linear functions $\Delta W_f$ is change in fuel flow $\Delta VSV$ is a change in aerofoil angle.

12. The method of claim 1, where a current thrust value is determined according to a spool speed of the engine.

13. A gas turbine engine for an aircraft comprising a control system arranged to operate according to the method of claim 1.

14. A controller for a gas turbine engine comprising machine readable instructions for controlling operation of the gas turbine engine by:
   receiving an instantaneous thrust demand for current operation of the gas turbine engine;
   determining a flow rate and/or a pressure ratio for a compressor of the gas turbine engine;
   determining whether the flow rate and/or the pressure ratio meet a predetermined operating condition of the compressor; and
   adjusting the angle of one or more aerofoil of the compressor according to a closed control loop if the flow rate and/or pressure ratio do not meet the predetermined operating condition in order to adjust the flow rate and/or pressure ratio towards said condition; and
   concurrently adjusting fuel flow to a combustor of the gas turbine engine in order to meet the thrust demand by mathematically decoupling terms for adjusting the angle of the one or more airfoil of the compressor and terms for adjusting the fuel flow to the combustor of the gas turbine engine in order to adjust the angle of the one or more aerofoil of the compressor and to adjust the fuel flow to the combustor of the gas turbine engine at a same time.

15. The controller of claim 14, wherein the controller further comprises a multivariable controller that is common to both the closed control loop for adjusting the angle of the one or more aerofoil and a further closed control loop for adjustment of the fuel flow.

16. A gas turbine engine for an aircraft comprising the controller of claim 14.

17. The gas turbine engine of claim 16, further comprising:
   an engine core comprising a turbine, a compressor, and a core shaft connecting the turbine to the compressor;
   a fan located upstream of the engine core, the fan comprising a plurality of fan blades; and
   a gearbox that receives an input from the core shaft and outputs drive to the fan so as to drive the fan at a lower rotational speed than the core shaft.

18. The gas turbine engine of claim 17, wherein:
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

\* \* \* \* \*